United States Patent [19]
Iwase

[11] Patent Number: 6,033,077
[45] Date of Patent: Mar. 7, 2000

[54] PROJECTION TYPE PICTURE DISPLAY APPARATUS

[75] Inventor: Hisanaga Iwase, Yamanashi-ken, Japan

[73] Assignee: Pioneer Electronic Corporation, Tokyo, Japan

[21] Appl. No.: 09/098,752

[22] Filed: Jun. 17, 1998

[30] Foreign Application Priority Data

Jun. 27, 1997 [JP] Japan ................................. 9-187826

[51] Int. Cl.[7] .................................................. G03B 21/16
[52] U.S. Cl. ................................................ 353/119; 353/61
[58] Field of Search .................................. 353/52, 57, 58, 353/60, 61, 119

[56] References Cited

U.S. PATENT DOCUMENTS

| | | | |
|---|---|---|---|
| 4,787,737 | 11/1988 | Ogawa et al. | 353/60 |
| 5,651,599 | 7/1997 | Fujimori et al. | 353/119 |
| 5,676,442 | 10/1997 | Fujimori | 353/119 |
| 5,842,761 | 12/1998 | Futakami et al. | 353/119 |
| 5,860,719 | 1/1999 | Suzuki et al. | 353/61 |

*Primary Examiner*—William Dowling
*Attorney, Agent, or Firm*—Nikaido marmelstein Murray & Oram LLP

[57] ABSTRACT

A projection type picture display apparatus, includes: an illumination optical system; a decomposition optical system; a plurality of liquid crystal display devices; a light synthesizing optical system; an enclosing case for accommodating the illumination optical system and the decomposition optical system; an optical chassis for fixedly mounting various optical elements including the liquid crystal display devices. A first space is formed under both the enclosing case and the optical chassis. A first opening is formed on a side wall of the enclosing case. At least one second opening is formed on the bottom of the enclosing case. At least a third opening is formed on the optical chassis in a position corresponding to at least one of the liquid crystal display devices. A cooling fan is provided in a position adjacent to the above first opening.

8 Claims, 3 Drawing Sheets

PROJECTION TYPE PICTURE DISPLAY APPARATUS

BACKGROUND OF THE INVENTION

The present invention relates to a picture display apparatus, in particular to a projection type picture display apparatus using reflective type liquid crystal display means.

FIG. 3 is an explanatory view indicating a conventional system for use as a projection type picture display apparatus. As shown in FIG. 3, a white light from a light source 1 is incident on a YDN (Yellow Reflecting Dichroic Mirror) 2a to be divided into a blue light which is a rectilinear light rectilinearly propagated through the YDM 2a, and a two-color light (including a green light and a red light) reflected from the YDN 2a.

Referring again to FIG. 3, the blue light rectilinearly propagated through the YDM 2a is further reflected by a reflecting mirror 3a and then incident on a light transmissible liquid crystal panel 4a (for use in processing a blue light). On the other hand, the two-color light (including a green light and a red light) is incident on a GDM (Green Reflecting Dichroic Mirror) 2b to be divided into a green light and a red light, respectively. Here, the green light is a reflected light from the GDM 2b, whilst the red light is a rectilinear light rectilinearly propagated through the GDM 2b. The green light reflected from the GDM 2b is incident on a light transmissible liquid crystal panel 4b (for use in processing a green light). On the other hand, the red light rectilinearly propagated through the GDM 2b is reflected by a reflecting mirror 3b and further by a reflecting mirror 3c so as to be incident on a light transmissible liquid crystal panel 4c (for use in processing a red light).

The light transmissible liquid crystal panel 4a (for use in processing a blue light), the light transmissible liquid crystal panel 4b (for use in processing a green light), the light transmissible liquid crystal panel 4c (for use in processing a red light), each comprises a pair of transparent electrode substrates forming an internal space therebetween which is filled with a liquid crystal so as to form a plurality of liquid crystal cells. Further, each of the light transmissible liquid crystal panels 4a, 4b, 4c includes on both sides thereof a pair of polarizing plates which are provided to cause a blue, green or red light to be incident onto a light synthesizing cross-prism 5.

The light synthesizing cross-prism 5 has a pair of dichroic mirrors 5a, 5b each consisting of a deposited film, which are arranged in a mutually crossed manner so that they are able to reflect or transmit various lights (blue, green and red lights).

In this way, a red light is allowed to pass through the dichroic mirror 5b and then reflected by the dichroic mirror 5a. A blue light is reflected by the dichroic mirror 5b and then is allowed to pass through the dichroic mirror 5a. Further, a green light is allowed to first pass through the dichroic mirror 5b and then through the dichroic mirror 5a. Therefore, various lights (blue, green and red lights) are synthesized in the light synthesizing cross-prism 5 to form a picture which is then enlarged through a projection lens 6 so as to be projected on a screen 7.

However, with the above-described conventional system shown in FIG. 3, since a high luminance lamp such as a xenon lamp or a halogen lamp is used as a light source, such a light source produces a considerable amount of heat. Further, since the polarizing plates allow the passing of some polarized lights but absorb other polarized lights, a considerable part of the incident light will be heated, hence causing a rise in the temperature of the optical system.

To cope with the temperature rising in the above optical system, it is possible to provide a cooling fan under an optical chassis fixedly mounting the polarizing plates, liquid crystal panels, and dichroic mirrors, so as to cool these optical elements by way of several holes formed through the optical chassis. This, however, will undesirably cause an increase in the total size of the optical system. If a clearance between the cooling fan and the apparatus frame structure is designed to be very small in order to inhibit an increase in the total size, there will be too large a resistance when a cooling air flows therethrough, resulting in a low cooling efficiency. Moreover, the use of a cooling fan will cause a noise which however should be avoided with a picture display apparatus.

SUMMARY OF THE INVENTION

It is an object of the present invention to provide an improved projection type picture display apparatus, which has only a small thickness and has an improved cooling efficiency, so as to solve the above-mentioned problems peculiar to the above-mentioned prior art.

According to the present invention, there is provided a projection type picture display apparatus, comprises: an illumination optical system; a decomposition optical system for decomposing a light emitted from the illumination optical system into a red light, green light and blue light; a plurality of liquid crystal display devices for receiving various color lights to produce various picture lights; a light synthesizing optical system for synthesizing the various picture lights to produce a synthesized picture light; an enclosing case for accommodating the illumination optical system and the decomposition optical system; an optical chassis for fixedly mounting various optical elements including the liquid crystal display devices.

A first space is formed under both the enclosing case and the optical chassis. A first opening is formed on a side wall of the enclosing case, such a first opening is in communication with a second space in the enclosing case. At least one second opening is formed on the bottom of the enclosing case, such second opening is in communication with the first space. At least a third opening is formed on the optical chassis in a position corresponding to at least one of the liquid crystal display devices. Similarly, such third opening is in communication with the first space. A cooling fan is provided in a position adjacent to the above first opening.

In particular, the cooling fan may be provided in a position adjacent to the first and fourth openings.

According to one aspect of the present invention, a fourth opening is formed under the above first opening, said fourth opening being in communication with the above first space.

According to another aspect of the present invention, each of the liquid crystal display devices is a reflective type liquid crystal display device capable of receiving a polarized light reflected from a beam splitter to produce a modulated picture light, so that the modulated picture light can be supplied to the light synthesizing optical system through the beam splitter.

According to a further aspect of the present invention, each of the liquid crystal display devices is a light transmissible type liquid crystal display device.

According to a still further aspect of the present invention, fifth openings are formed on the optical chassis in positions corresponding to the polarizing plates, said fifth openings being in communication with the above first space.

According to a still further aspect of the present invention, a sixth opening is formed on the enclosing case in a position corresponding to a prism array provided within the enclosing case.

The above objects and features of the present invention will become better understood from the following description with reference to the accompanying drawings.

DETAILED DESCRIPTION OF THE PREFERRED EMBODIMENTS

Figure 1:
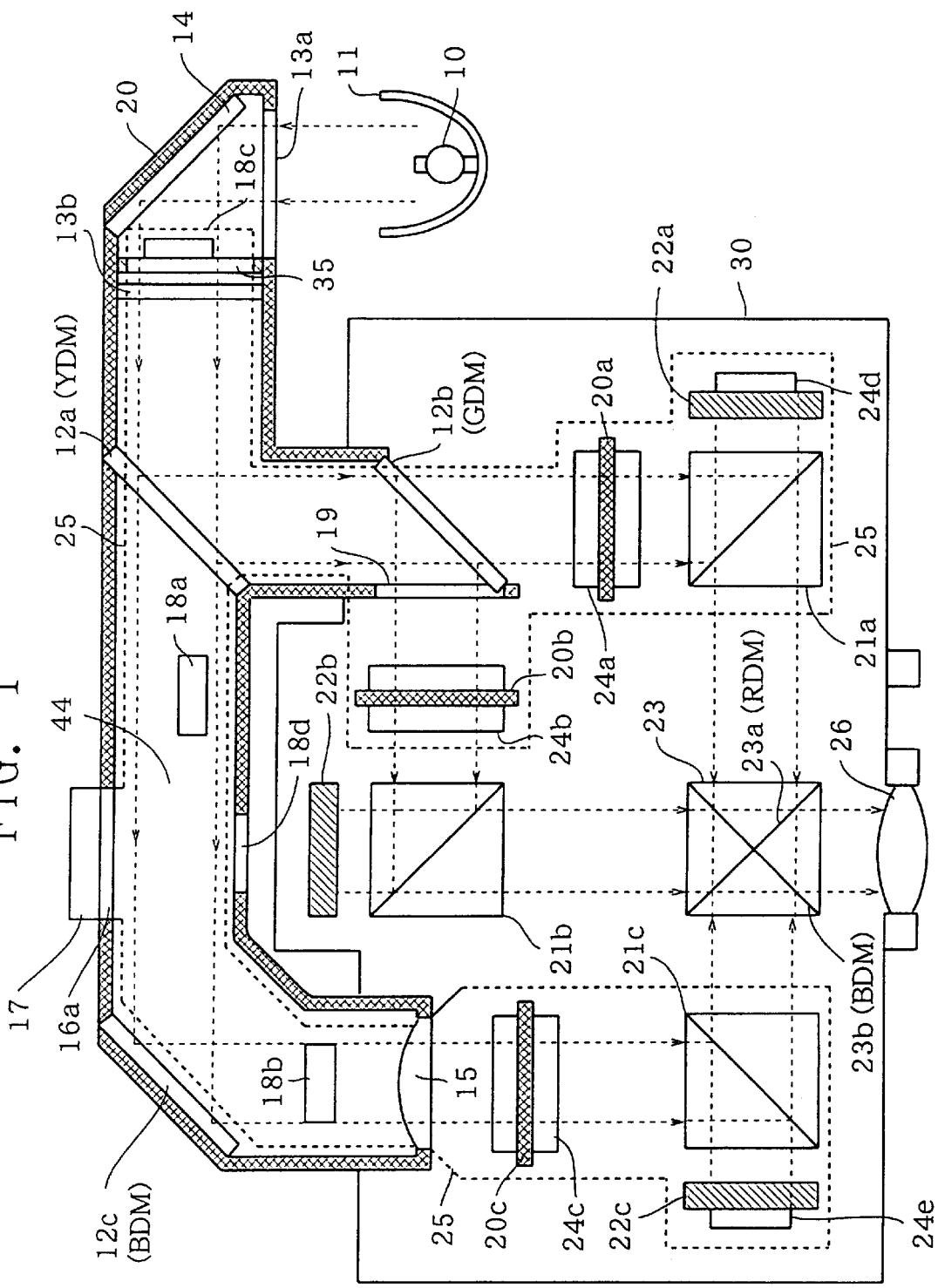
FIG. 1 is a plain view indicating the structure of a projection type picture display apparatus made according to one embodiment of the present invention.

Referring to FIG. 1 showing one embodiment of the present invention, a light source 10 comprises a halogen lamp or a xenon lamp capable of producing a white light. Such a white light, whose polarizing direction is random, is reflected by a reflector 11 to form a substantially collimated light beam which is then incident onto an illumination optical system.

The illumination optical system comprises a first integrator lens (a first lens plate) 13a, a mirror 14, a prism array 35, a second integrator lens (a second lens plate) 13b.

The integrator lens 13a is comprised of several rectangular collecting lenses, capable of collecting an incident light (whose polarizing direction is random) from the light source 10 to form a plurality of secondary light sources.

The prism array 35 is disposed in the vicinity of a position where a plurality of secondary light sources are formed. The prism array 35 includes a plurality of polarizing beam splitters, ½ wavelength plates provided on the output sides of the polarizing beam splitters, capable of converting incident lights into a predetermined first kind of polarized lights having their polarization planes aligned with one another. The second integrator lens 13b is provided on the output side of the prism array 35, and is also comprised of several rectangular collecting lenses.

The first integrator lens 13a and the second integrator lens 13b together form an integrator optical system. The light beam from the light source 10 is divided by the several rectangular collecting lenses (forming the first integrator lens 13a). A plurality of secondary light sources formed by the several rectangular collecting lenses (forming the first integrator lens 13a) are passed through the second integrator lens 13b to effect a superincumbent image-formation on a predetermined illuminated area (a display surface of a liquid crystal display apparatus). Here, the rectangular collecting lenses of the second integrator lens 13b have been made corresponding to the rectangular collecting lenses of the first integrator lens 13a.

With the use of the above illumination optical system, the light from the light source 10 may be used with a high efficiency, intensity distribution of a light illuminating a predetermined area may be made substantially uniform.

A plurality of secondary light sources (a plurality of fine light beams) formed by the first integrator lens 13a, are divided into P polarized light and S polarized light, by virtue of several beam splitters of the prism array 35. One polarized light passes directly through the beam splitters, the other polarized light is reflected therefrom so that its proceeding direction is changed 90 degrees. Since the reflected light is again reflected by an adjacent surface to have its proceeding direction changed for another 90 degrees, said reflected light is emitted from the prism array 35 in a direction substantially parallel to the above one polarized light.

The ½ wavelength plate is positioned on the emitting surface of the prism array 35, from which the above one polarized light is emitted. The above one polarized light, upon passing through the ½ wavelength plate, receives a rotating action and is converted into the above other polarized light. On the other hand, the above other polarized light, reflected by an adjacent surface and emitted therefrom, does not pass through the ½ wavelength plate so that it does not receive a rotating action, and is thus directly emitted out. In this way, by virtue of the prism array 35, a polarized light having a random polarizing direction is converted into the first kind of polarized light, thereby greatly improving the efficiency for the use of the light beam.

The light beam passed through the second integrator lens 13b is incident on a YDI (Yellow Reflecting Dichroic Mirror) 12a to be divided into a rectilinearly propagating blue light and a reflected two-color light (including a green light and a red light). The blue light rectilinearly propagated through the YDN 12a is reflected by a BDM (Blue Reflecting Dichroic mirror) 12c, pass through a lens 15, so as to be incident on a polarizing plate 20c provided on an optical chassis 30.

Polarizing plates 20a, 20b, 20c are each provided to allow the passing of a predetermined polarized light (either P component polarized light or S component polarized light), to properly arrange the polarized light before it is incident onto one of beam splitters 21a, 21b, 21c, but to absorb other polarized light (either S component polarized light or P component polarized light). For example, P component polarized light passed through the polarizing plate 20c is incident on the beam splitter 21c. In this way, P component polarized light (or S component polarized light) is passed through the splitter 21c, and S component polarized light (or P component polarized light) is reflected. Finally, P component polarized light (or S component polarized light) is incident on the display of a reflective type liquid crystal display device 22c (for treating a blue light).

S component polarized light incident on the reflective type liquid crystal display devices 22c, whose polarization state has been changed in accordance with picture element data of original colors RGB (Red, Green, Blue), is emitted therefrom in a direction which is an incident direction of the polarized light.

Among the lights emitted from the reflective type liquid crystal display device 22c, P component polarized light (or S component polarized light) whose polarization state has been changed, passes through the dividing surface of the beam splitter 21c and is incident on a light synthesizing cross-prism 23. On the other hand, a polarized light (S component polarized light) whose polarization state has not been changed, is reflected by the dividing surface, and is absorbed by the polarizing plate 20c.

On the other hand, the two-color light (including a green light and a red light) reflected by the YDM (Yellow Reflecting Dichroic Mirror) 12a, is incident on a GDM (Green Reflecting Dichroic Mirror) 12b which reflects a green light but allows a red light to pass therethrough. Then, the reflected green light passes through a transparent glass plate 19 so as to be incident onto a polarizing plate 20b.

Among the light reflected by the GDM 12b, S component polarized light (or P component polarized light) is absorbed by the polarizing plate 20b, while P component polarized light (or S component polarized light) is allowed to pass therethrough to be incident on a beam splitter 21b. In this way, P component polarized light (or S component polarized light) is passed through a dividing surface of the splitter 21c, while S component polarized light (or P component polarized light) is reflected therefrom. Finally, S component polarized light (or P component polarized light) is incident on the display of a reflective type liquid crystal display device 22b (for treating a green light). In the reflective type liquid crystal display device 22b, the polarizing state of the polarized light is changed in accordance with picture element data of original colors RGB (Red, Green, Blue). Such a polarized light is then emitted from the display device 22b, and is allowed to pass through the dividing surface of the splitter 21b, so as to be incident on the light synthesizing cross-prism 23.

Further, among the light passed through the GDM 12b, S component polarized light (or P component polarized light) is absorbed by the polarizing plate 20a, while P component polarized light (or S component polarized light) is allowed to pass therethrough to be incident on a beam splitter 21a.

In this way, P component polarized light (or S component polarized light) is passed through a dividing surface of the splitter 21a, while S component polarized light (or P component polarized light) is reflected therefrom so as to be incident on the display of a reflective type liquid crystal display device 22a (for treating a red light).

In the reflective type liquid crystal display device 22a, the polarization state of the polarized light is changed in accordance with picture element data of original colors RGB (Red, Green, Blue). Such a polarized lights is then emitted from the display device 22a, and is allowed to pass through the dividing surface of the splitter 21a, so as to be incident on the light synthesizing cross-prism 23.

Among the lights incident on the light synthesizing cross-prism 23, a red picture light is allowed to pass through a dichroic mirror surface 23b (provided in the light synthesizing cross-prism 23), but is reflected by a dichroic mirror surface 23a (also provided in the light synthesizing cross-prism 23). Further, a blue picture light is reflected by the dichroic mirror surface 23b, but is allowed to pass through the dichroic mirror surface 23a. Moreover, a green picture light is allowed to pass through both the dichroic mirror surface 23a and dichroic mirror surface 23a.

The above various picture lights are synthesized in the light synthesizing cross-prism 23 to form a synthesized picture light which is then passed through a projection lens 26 so as to be projected in an enlarged size on a screen (not shown).

The above discussed illumination optical system, the yellow reflecting dichroic mirror 12a, the green reflecting dichroic mirror 12b, the blue reflecting dichroic mirror 12c and the lens 15, are all received into an enclosing case 20.

Further, the above mentioned polarizing plates 20a, 20b 20c, the beam splitter 21a, 21b, 21c, the reflective type liquid crystal display devices 22a, 22b, 22c, the light synthesizing cross-prism 23 and the projection lens 26, are all fixedly positioned on an optical chassis 30.

A heat radiating structure of the projection type picture display apparatus according to the present invention, will be described with reference to FIGS. 1 and 2.

The light source 10, the enclosing case 20, and the optical chassis 30 are all covered by an upper cabinet board 40 and a lower cabinet board 41.

A space under both the enclosing case 20 and the optical chassis 30 is defined by the bottom surfaces of the case 20 and the optical chassis 30, an upper surface of the lower cabinet board 41, frame members 25 vertically provided on the upper surface of the lower cabinet board 41, thereby forming a first space 43.

Referring to FIG. 1, in the enclosing case 20, an optical path between the yellow reflecting dichroic mirror 12a and the lens 15, is almost sealed so as to form a second space 44. On the side wall of the enclosing case 20 is formed with a first opening 16a, on the bottom of the case 20 are formed two second openings 18a and 18b.

Figure 2A:
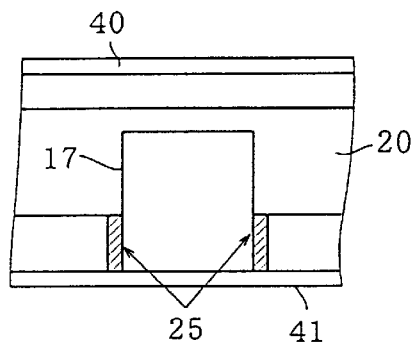
FIGS. 2a–2h are cross sectional views each indicating part of the projection type picture display apparatus of FIG. 1.
Figure 2B:
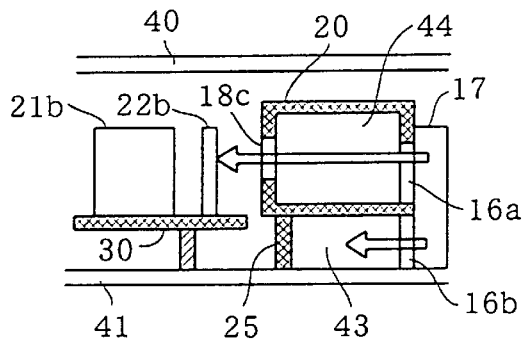
Figure 2C:
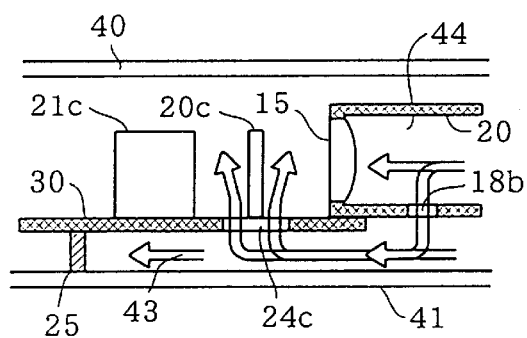
Figure 2D:
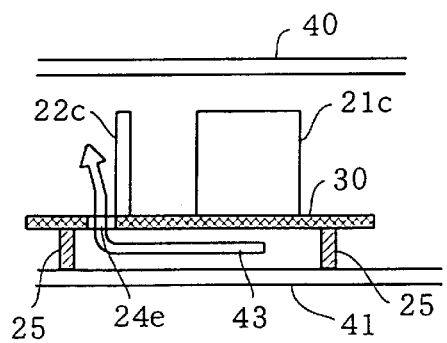
Figure 2E:
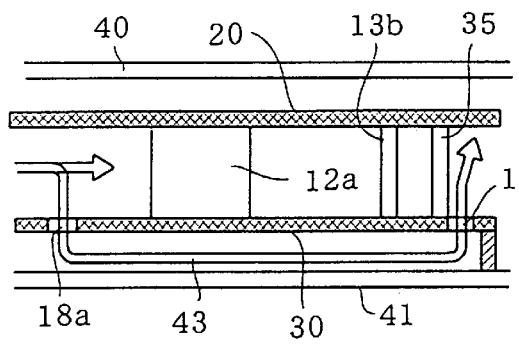
Figure 2F:
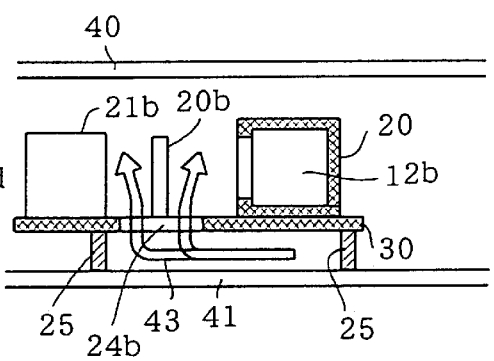
Figure 2G:
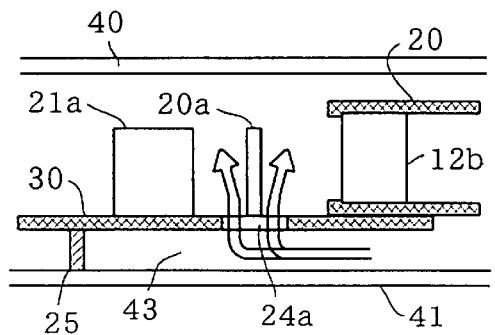
Figure 2H:
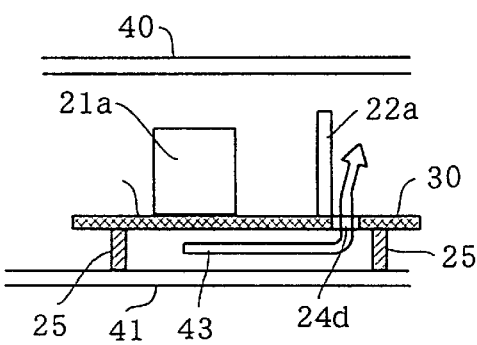

Further, a fourth opening 16b is formed under the first opening 16a (FIG. 2b).

A cooling fan 17 is provided adjacent to the openings 16a and 16b on a side wall of the enclosing case 20, so as to supply cooling air into the first space 43 and the second space 44 through the openings 6a, 16b, as shown in FIGS. 2a and 2b.

The optical chassis 30 are formed with two third openings 24d and 24e (in communication with the first space 43) in positions corresponding to the reflective type liquid crystal display devices 22a and 22c, and fifth openings 24a, 24b and 24c (in communication with the first space 43) in positions corresponding to the polarizing plates 20a, 20b, 20c.

Further, as shown in FIG. 2b, a sixth opening 18c (in communication with the first space 43) is formed on the enclosing case 20 in a position corresponding to the prism array 35, and a seventh opening 18d (in communication with the second space 44) is also formed on the case 20 in a position corresponding to the reflective type liquid crystal display device 22b.

With the use of the above described arrangement, a cooling air is generated by the cooling fan 17 and is supplied to the reflective type liquid crystal display device 22a, through a flow path including the opening 16a, the space 44, the opening 18a, the space 43, the opening 24d, and another flow path including the opening 16b (FIG. 2b), space 43, opening 24d. The cooling air, after having passed the above flow paths, is allowed to cool the reflective type liquid crystal display device 22a and then flow away.

Meanwhile, a cooling air generated by the cooling fan 17 is supplied to the reflective type liquid crystal display device 22c, through a flow path including the opening 16a, the space 44, the opening 18b, the space 43, the opening 24e, and another flow path including the opening 16b, space 43, the opening 24e. The cooling air, after having passed the above flow paths, is allowed to cool the reflective type liquid crystal display device 22c and then flow away.

Further, a cooling air generated by the cooling fan 17 is supplied to the reflective type liquid crystal display device 22b, through a flow path including the opening 16a, the space 44, the opening 18d.

Moreover, a cooling air generated by the cooling fan 17 is supplied to the polarizing plate 20a, through a flow path including the opening 16a, the space 44, the opening 18a, the space 43, the opening 24a, and another flow path including the opening 16b, space 43, the opening 24a. The cooling air, after having passed the above flow paths, is allowed to cool the polarizing plate 20a and then flow away.

Meanwhile, a cooling air generated by the cooling fan 17 is supplied to the polarizing plate 20b, through a flow path including the opening 16a, the space 44, the opening 18a, the space 43, the opening 24b, and another flow path including the opening 16b, space 43, the opening 24b. The cooling air, after having passed the above flow paths, is allowed to cool the polarizing plate 20b and then flow away.

Similarly, a cooling air generated by the cooling fan 17 is supplied to the polarizing plate 20c, through a flow path including the opening 16a, the space 44, the opening 18b, the space 43, the opening 24c, and another flow path including the opening 16b, space 43, the opening 24c. The cooling air, after having passed the above flow paths, is allowed to cool the polarizing plate 20c and then flow away.

Furthermore, a cooling air generated by the cooling fan 17 is supplied to the prism array 35, through a, flow path including the opening 16a, the space 44, the opening 18a, the space 43, the opening 18c, and another flow path including the opening 16b, space 43, the opening 18c.

Figure 3:
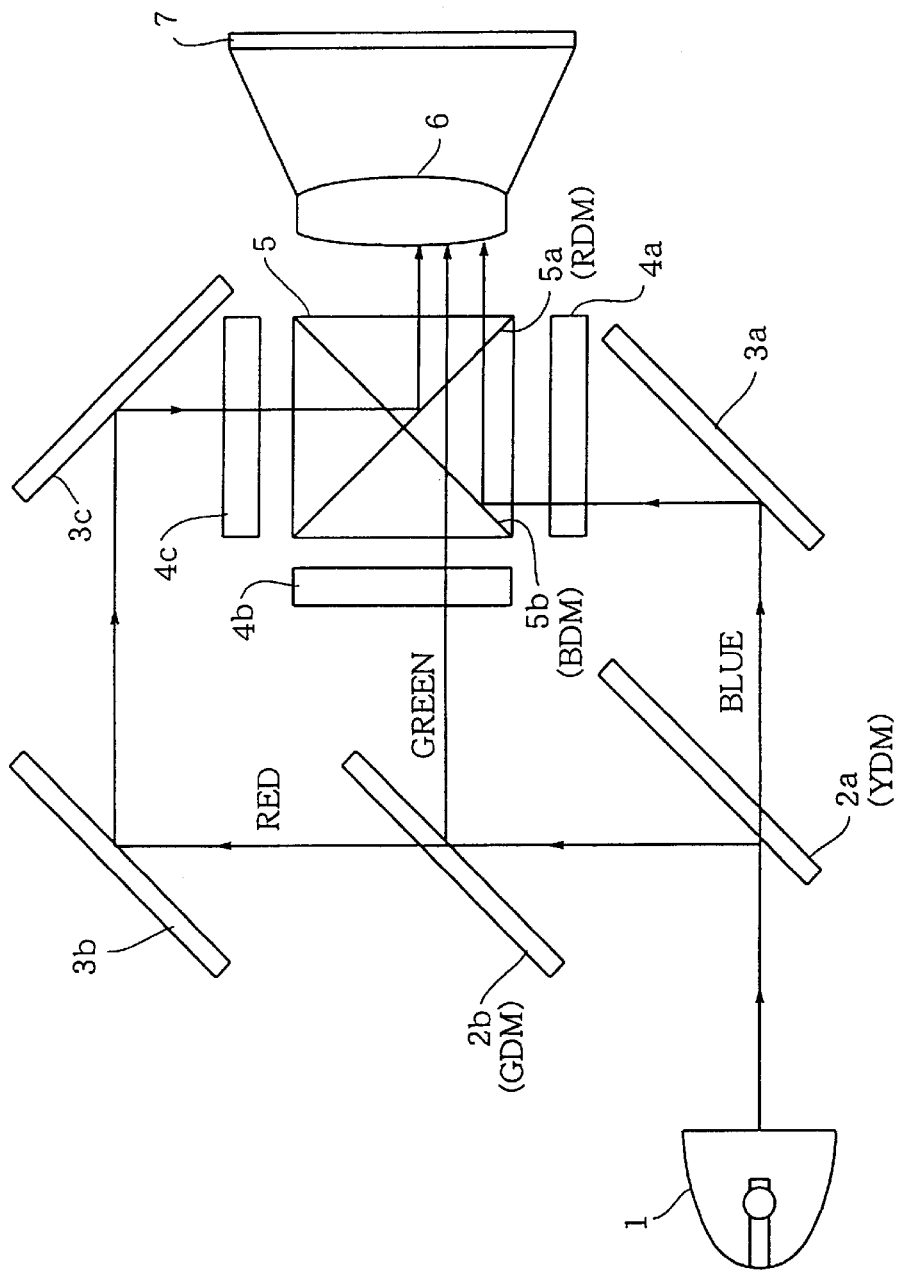
FIG. 3 is an explanatory view schematically illustrating a conventional optical system for use as a projection type picture display apparatus, according to a prior art.

Although it has been described in the above embodiment that reflective type liquid crystal display devices are used, it is also possible to substitute these reflective type liquid crystal display devices with light transmissible type liquid crystal display device. For example, the light transmissible liquid crystal display panels shown in FIG. 3 may be used.

In detail, the yellow reflecting dichroic mirror 2a, the green reflecting dichroic mirror 2b, the reflecting mirrors 3a, 3b, 3c, all of which together form a color decomposing optical system, are housed in an enclosing case like the case 20. The light transmissible liquid crystal display panels 4a, 4b, 4c, the light synthesizing cross-prism 5 and the projection lens 6 are fixed on an optical chassis like the chassis 30. In this way, it is also possible to form a first space under both the enclosing case and the optical chassis, a first and fourth openings on the enclosing case, a second opening on the enclosing case for communicating a second space in the enclosing case with the above first space, two third openings on the optical chassis in positions corresponding to the light transmissible liquid crystal panels. A cooling fan like the fan 17 can be provided adjacent to the above first and fourth openings on the enclosing case.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A projection type picture display apparatus, comprising:

an illumination optical system;

a decomposition optical system for decomposing a light emitted from the illumination optical system into a red light, green light and blue light;

a plurality of liquid crystal display devices for receiving various color lights to produce various picture lights;

a light synthesizing optical system for synthesizing the various picture lights to produce a synthesized picture light;

an enclosing case for accommodating the illumination optical system and the decomposition optical system;

an optical chassis for fixedly mounting various optical elements including the liquid crystal display devices; and an outer casing enclosing said enclosing case and said optical chassis, wherein a first space is formed under both the enclosing case and the optical chassis; a first opening is formed on a side wall of the enclosing case, said first opening being in communication with a second space in the enclosing case; at least one second opening is formed on the bottom of the enclosing case, said second opening being in communication with the first space; at least a third opening is formed on the optical chassis in a position corresponding to at least one of the liquid crystal display devices, said third opening being in communication with the first space; a cooling fan is provided in a position adjacent to the first opening.

2. A projection type picture display apparatus according to claim 1, wherein a fourth opening is formed under the first opening, said fourth opening being in communication with the first space.

3. A projection type picture display apparatus according to claim 2, wherein the cooling fan is provided in a position adjacent to the first and fourth openings.

4. A projection type picture display apparatus according to claim 1 or 2, wherein the various optical elements include a plurality of polarizing plates each of which is adapted to transmit a predetermined polarized light but absorb other polarized light, and a plurality of beam splitters each of which is adapted to reflect a predetermined polarized light from a polarizing plate.

5. A projection type picture display apparatus according to claim 1, wherein each of the liquid crystal display devices is a reflective type liquid crystal display device capable of receiving a polarized light reflected from a beam splitter to produce a modulated picture light, so that the modulated picture light can be supplied to the light synthesizing optical system through the beam splitter.

6. A projection type picture display apparatus according to claim 1, wherein each of the liquid crystal display devices is a light reflective type liquid crystal display device.

7. A projection type picture display apparatus according to claim 2, wherein openings are formed on the optical chassis in positions corresponding to the polarizing plates, said openings being in communication with the first space.

8. A projection type picture display apparatus according to claim 7, wherein an opening is formed on the enclosing case in a position corresponding to a prism array provided within the enclosing case.

* * * * *